(12) United States Patent
Chang

(10) Patent No.: US 9,390,437 B2
(45) Date of Patent: Jul. 12, 2016

(54) METHOD AND SYSTEM FOR MONITORING ADVERTISEMENT DISPLAYS

(71) Applicant: Alibaba Group Holding Limited, George Town (KY)

(72) Inventor: Hengyu Chang, Beijing (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 14/013,970

(22) Filed: Aug. 29, 2013

(65) Prior Publication Data

US 2014/0067550 A1    Mar. 6, 2014

(30) Foreign Application Priority Data

Sep. 5, 2012  (CN) .......................... 2012 1 0326662

(51) Int. Cl.
*G06Q 30/00* (2012.01)
*G06Q 30/02* (2012.01)

(52) U.S. Cl.
CPC ........ *G06Q 30/0272* (2013.01); *G06Q 30/0248* (2013.01); *G06Q 30/0277* (2013.01)

(58) Field of Classification Search
CPC ....................... G06F 17/2247; G06F 17/30905
USPC ........................................................ 705/14.1
See application file for complete search history.

(56) References Cited

U.S. PATENT DOCUMENTS

| | | | |
|---|---|---|---|
| 8,165,915 B1 | 4/2012 | Lucash | |
| 8,326,763 B2 | 12/2012 | Zuili | |
| 8,346,609 B2 | 1/2013 | Lee et al. | |
| 8,583,482 B2 | 11/2013 | Netzer et al. | |
| 2002/0082923 A1 | 6/2002 | Merriman et al. | |
| 2004/0225562 A1 | 11/2004 | Turner | |
| 2007/0162520 A1 | 7/2007 | Petersen et al. | |
| 2008/0320125 A1 | 12/2008 | Osullivan et al. | |
| 2009/0157503 A1* | 6/2009 | Farouki .............. | G06Q 30/0273 705/14.69 |
| 2009/0228802 A1 | 9/2009 | Shan et al. | |
| 2010/0082423 A1 | 4/2010 | Nag et al. | |

(Continued)

FOREIGN PATENT DOCUMENTS

| | | |
|---|---|---|
| JP | 2007286803 | 11/2007 |
| WO | 0186424 | 11/2001 |

OTHER PUBLICATIONS

Mike Shields "The Amount of Questionable Online Traffic Will Blow Your Mind", Adweek, Oct. 13, 2013, retrieved at http://www.adweek.com/news/technology/amount-questionable-online-traffic-will-blow-your-mind-153083 on May 20, 2016.

*Primary Examiner* — Daniel Lastra
(74) *Attorney, Agent, or Firm* — Van Pelt, Yi & James LLP

(57) ABSTRACT

Embodiments of the present application relate to a method for monitoring advertisement displays, a system for monitoring advertisement displays, and a computer program product for monitoring advertisement displays. A method for monitoring advertisement displays is provided. The method includes acquiring advertisement request information in an advertisement request of a page to be monitored. encoding and generating an advertising space view for loading in the to-be-monitored page based on the advertisement request information, acquiring a page view of the to-be-monitored page, dissecting the page view to acquire advertising space display information, and analyzing the advertising space display information to determine whether an advertisement display of the to-be-monitored page is consistent with the advertisement request information.

16 Claims, 9 Drawing Sheets

(56) References Cited

U.S. PATENT DOCUMENTS

| | | |
|---|---|---|
| 2010/0138271 A1 | 6/2010 | Henkin et al. |
| 2010/0153544 A1* | 6/2010 | Krassner et al. ............ 709/224 |
| 2010/0153836 A1 | 6/2010 | Krassner et al. |
| 2010/0161411 A1 | 6/2010 | Wu et al. |
| 2010/0299202 A1 | 11/2010 | Li et al. |
| 2012/0117458 A1 | 5/2012 | Holloway et al. |
| 2013/0110649 A1 | 5/2013 | Sugiura et al. |

* cited by examiner

600

METHOD AND SYSTEM FOR MONITORING ADVERTISEMENT DISPLAYS

CROSS REFERENCE TO OTHER APPLICATIONS

This application claims priority to People's Republic of China Patent Application No. 201210326662.9 entitled METHOD AND EQUIPMENT FOR MONITORING ADVERTISEMENT DISPLAYS, filed Sep. 5, 2012 which is incorporated herein by reference for all purposes.

FIELD OF THE INVENTION

The present application relates to a method and system for monitoring advertisement displays.

BACKGROUND OF THE INVENTION

In Internet advertising, Internet advertising alliances typically provide website owners with advertising code (typically JavaScript code). The website owners embed the advertising code in their web pages and display advertisements provided by the Internet advertising alliances. The Internet advertising alliances also take a share of the earnings from the displayed advertisements. When a user browses a web page including the advertising code, the client equipment where the user is located runs the advertising code and sends an advertising request to advertisement front-end servers. The advertisement front-end servers record information relating to the advertising request in an advertisement request log, execute an advertisement selection algorithm, and send back an advertisement segment. After the advertisement segment is organized by the browser, the advertisement segment is ultimately displayed in a fixed position within an advertisement display zone on the web page. Typically, the advertisement display zone is a rectangular zone. The rectangular zone includes text, pictures, multimedia, and other information presented to the user and is called an advertising space.

The "advertisement request" refers to a data exchange between the client equipment and the advertisement front-end servers via a hypertext transport protocol (HTTP). The advertisement request includes an advertising space identification (ID), advertising space width and height, an advertisement request source page, and other such information. After the advertisement front-end servers receive the advertisement request, the advertisement front-end servers record the information relating to the advertising request in an advertisement request log and respond to the advertisement request of the client equipment by sending back advertisement data to the client equipment.

After the client equipment receives the advertisement data sent back by the advertisement front-end servers, a browser organizes the advertisement data and displays the advertisement data based on the relevant parameters in the advertisement request. No blocking or concealment of the corresponding advertisement display zone exists in the displayed web page.

Typically, by counting the number of advertisement requests in the advertisement request log, the advertising alliance generates page view volume reports of different granularities (for example, website, advertising space, source page), and these page view volume reports guide subsequent apportionment of earnings. Therefore, the page view volume reports are basic data whereby the Internet advertising alliances and the website owners settle accounts. To increase earnings, some website owners employ some unreasonable technical means to increase page view volumes of website advertisements, resulting in serious discrepancies between an amount of advertisement requests and an amount of advertisement displays. These discrepancies harm the interests of the website owners and the Internet advertising alliances.

The technical means that the some website owners employ to raise website advertisement page view volumes mainly include the following:

1. No advertising code is embedded in the page, and an advertisement request is automatically counterfeited by a program.

2. An advertising code is embedded in the page, but the advertising space is concealed using iframe or some other technique. For example, page A has a fixed flow, but no idle advertising space. Page B has idle advertising space, but no flow. The flow refers to ad traffic or ad page views. Page A conceals page B within page A using iframe. When a user visits page A, the user triggers a page B advertisement request. However, because the entire page B is concealed, the advertisement request relating to page B is not displayed.

3. An advertising code is repeatedly embedded in a page to duplicate flow. For example, when a user visits a page, a plurality of advertisement requests are triggered, but only one advertisement display is generated.

4. Page advertisements are piled up and some advertisements are blocked by other advertisements so that the actual advertising result is not achieved.

5. Advertising space positions are falsely reported. For example, an advertisement is declared to the advertising alliance that the advertising space is displayed on the browser home screen when in fact the advertisement is displayed somewhere other than on the browser home screen.

The current advertising volume on the Internet is quite large. Therefore, to use manual sampling to discover advertisement display problems requires a large expenditure of manpower and time. In addition, manual sampling has rather poor coverage and is inefficient. To increase the coverage and efficiency of advertisement display sampling, two main solutions are as follows:

In a first solution, the browser executes JavaScript code provided by background servers, collects advertisement page information (such as advertiser ID, display space size, etc.), and adds the collected advertisement page information as parameters into an advertisement request. Advertisement front-end servers record information relating to the advertisement request and perform data mining on the recorded advertisement request information to uncover abnormalities in the advertisement request. For example, the advertisement front-end servers compile statistics on time intervals of the same advertisement request corresponding to the same advertiser ID. When the time intervals fall below a threshold value, a determination is made that the advertisement display has become abnormal.

In a second solution, advertising page addresses (e.g., uniform resource locators (URLs) of advertising pages) are extracted from an advertisement request log, and a crawling technique is employed to capture advertising pages and advertising page scripts and to identify problems by restoring the page layout.

The above conventional solutions include at least the following limitations.

In the first solution, JavaScript code is executed by a browser to acquire DOM (Document Object Model) node information. The JavaScript code has a certain page layout-acquiring capability and roughly locates the advertising space, but because of browser security restrictions, limited top-level page access capability exists when JavaScript code having multi-level nested iframes is executed, and restoring the actual layout of the page is not possible. Moreover, because page technology for building a web page is complex, web page building techniques that use XHTML, HTML, CSS, JavaScript are relatively inaccurate ways of assessing blocking or concealment.

In the second solution, crawling and capturing advertising pages and scripts of advertising pages requires a powerful browser core engine to render HTML (Hypertext Markup Language) and CSS (Cascading Style Sheets) and to execute page scripts correctly. Because of the complexity, diversity, multi-level nesting, Ajax requests, Flash media, browser core engine compatibility, and other such problems involved in the technologies employed by web pages, relying solely on analysis of page code is a relatively inaccurate way of restoring the actual display condition of advertisements.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present application discloses a method and system for monitoring advertising displays. Advertising displays are monitored with increased accuracy based on the following: acquiring advertisement request information in an advertisement request of a page that is to be monitored, encoding and generating an advertising space view for loading in the to-be-monitored page based on the advertisement request information, acquiring a page view of the to-be-monitored page following loading, dissecting the page view to acquire advertising space display information, and analyzing the advertising space display information to determine whether the to-be-monitored page display is normal.

Figure 1:
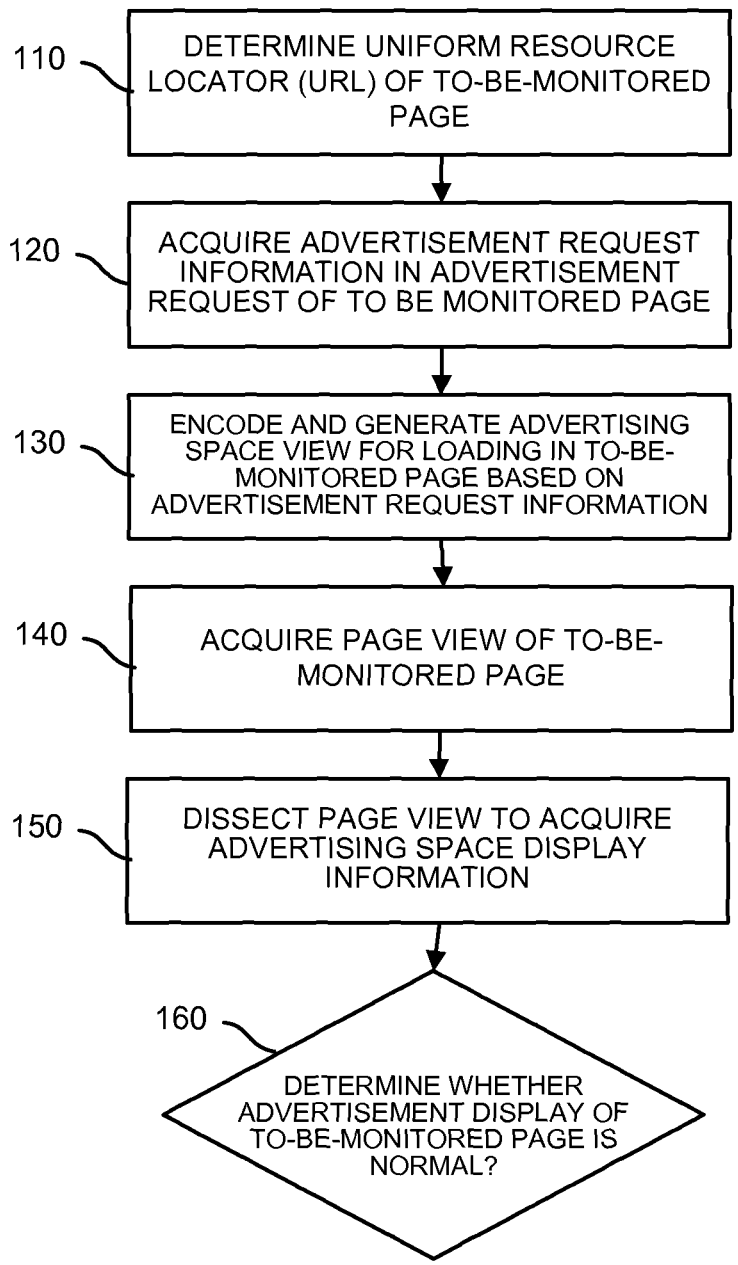
FIG. 1 is a flowchart of an embodiment of a process for monitoring advertising displays.

FIG. 1 is a flowchart of an embodiment of a process for monitoring advertising displays. In some embodiments, the process 100 is implemented by a server 210 of FIG. 2 and includes:

In 110, the server determines a uniform resource location (URL) of a to-be-monitored page.

In some embodiments, the process 100 begins with an issuance of an advertisement request from a web browser and ends with an advertisement display, and information relating to the advertisement request is recorded into a log file. In some embodiments, an administrator wants to determine whether the ads are properly displayed on the webpage. The advertisement request information includes an advertisement request issuance timestamp, an advertising space identifying code, an advertising space specification, an advertising space source page URL, or any combination thereof. An advertising space source page is a page that publishes an advertisement as designated in the advertisement request. In other words, the advertising space source page is the page that issues the advertisement request information and is used to provide advertising space. The advertising space specification includes advertising space width and height.

In some embodiments, the URL of the to-be-monitored page is determined based on: collecting the advertisement request log, acquiring URLs of the advertising space source pages recorded in the advertisement request log, and then determining the URL of the to-be-monitored page based on the URLs of the advertising space source pages. In other words, the to-be-monitored page is selected from the advertising space source pages recorded in the advertisement request log.

Furthermore, the URL of the to-be-monitored page is also determined according to the number of page views of the URLs of the advertising space source pages. In some embodiments, an accounting is made of the number of occurrences of advertising space source page URLs recorded in the advertisement request log. In other words, the number of page views (PVs) of a URL, and the advertising space source page URLs are ranked in descending order according to the number of PVs, with a first N URLs serving as URLs of to-be-monitored pages (N corresponding to a natural number). In some embodiments, an accounting is made of the number of occurrences of the advertising space source page URLs recorded in the advertisement request log, and URLs of advertising space source pages whose occurrence frequencies exceed a preset threshold value are determined to be the URLs of the to-be-monitored pages.

In 120, the server acquires advertisement request information included in an advertisement request of the to-be-monitored page based on a URL of the to-be-monitored page.

In some embodiments, after the URL of the to-be-monitored page is determined, the server controls a browser core to access the URL of the monitored page in order to monitor the generated HTTP request (in other words, data transfer request based on Hypertext Transfer Protocol corresponding to "HTTP request" below) and identify the advertisement request among the monitored HTTP request and then to acquire advertisement request information included in the advertisement request. In some embodiments, the advertisement request information includes the following types of parameter information: an advertising space ID, an advertising space specification, URLs of advertising space source pages, or any combination thereof. The advertising space specification includes advertising space height and width.

In 130, the server encodes and generates an advertising space view for loading in the to-be-monitored page based on the advertisement request information. For example, the advertising space view or advertising zone view is a block or a banner inserted into a complete web page.

In some embodiments, the advertisement request information is encoded to generate the advertising space view for loading in the to-be-monitored page. The advertisement request information is conveyed by pixel values of pixel points in image data. When a page loads, the advertisement request information is rendered in the page based on a predetermined coding rule as the pixel points of the image data.

In some embodiments, the server generates an advertising space code including the advertisement request information based on the advertisement request to generate the advertising space view loaded in the to-be-monitored page including at least one of the two modes below.

In a first mode, the advertisement request is redirected towards a view-rendering server. The view-rendering server generates a segment of an advertising space code for rendering an advertising space view in the midst of the to-be-monitored page following loading based on the received advertisement request. When the browser loads the to-be-monitored page, the segment of the advertising space code is executed, and the advertising space code is used to render the advertising space view including the advertisement request information. In other words, the advertisement request information is encoded as pixel data of pixel points of the advertising space view.

The redirection of the advertisement request to the view-rendering server is brought about by modifying an address of the advertisement request's request object (in other words, server or host that provides advertisement data in response to the advertisement request). In some embodiments, the advertising space code is HTML code generated by the view-rendering server based on parameter information in the advertisement request. In some embodiments, the advertising space code is JavaScript code or CSS code. In some embodiments, the advertising space code includes a predetermined encoding rule, and the parameter information in the advertisement request is encoded in accordance with the predetermined encoding rule to form image pixel data. The advertising space code is provided by the view-rendering server as information in response to the advertisement request to the browser accessing the to-be-monitored page. The browser, by executing the advertising space code, generates the advertising space view including the parameter information in the advertisement request. In some embodiments, the advertising space view includes a static graphic block or a dynamic image, such as a Flash-format animation.

In a second mode, the advertisement request is redirected to the view-rendering server, which provides the data source needed by the to-be-monitored page to load an advertisement. In some embodiments, the view-rendering server uses parameter information in the advertisement request to generate the advertising space view. The generation of an advertising space view includes encoding parameter information in the advertisement request into image pixel data. The view-rendering server sends back the advertising space view to the to-be-monitored page and embeds the advertising space view into the to-be-monitored page to serve as advertisement data loading per the advertisement request.

As for HTTP requests in this context that are not advertisement requests, the HTTP requests are processed according to conventional process flows. The specific processing of the HTTP requests will not be further discussed for conciseness.

In 140, the server acquires a page view of the to-be-monitored page following loading.

When the browser completes the process of accessing the to-be-monitored page, the browser stores a page view of the to-be-monitored page. In some embodiments, the page view is a Bitmap image file (BMP) or Portable Network Graphics (PNG). A page view is a full web page displayed in a browser application. Subsequently, a screenshot captures the displayed web page and the screenshot is saved as an image in a BMP or PNG format.

In 150, the server dissects the page view to acquire advertising space display information.

In some embodiments, the dissecting is just analyzing. In other words, the server analyzes the page view to acquire advertising space display information.

In some embodiments, the page view is dissected to obtain advertising space display information. The advertising space display information includes the following: advertising space ID, actual display width of the advertising space, actual display height of the advertising space, coordinates where the advertising space is displayed on the page image, advertising space source page URL, or any combination thereof.

In some embodiments, when the to-be-monitored page loads the advertising space view normally, the complete advertising space view is included within the acquired page view. The advertising space view is located by dissecting the page view. Then, by dissecting the advertising space view within the page view, the parameter information in the advertisement request included in the advertising space view is obtainable. Therefore, the process of dissecting the page view to acquire advertising space display information relates to the process of analyzing the parameter information in the advertisement request included in the page view.

In 160, the server analyzes the advertising space display information to determine whether an advertisement display of the to-be-monitored page is normal.

In some embodiments, after acquiring the advertisement request information corresponding to the to-be-monitored page and the advertising space display information, the server determines whether the advertisement display of the to-be-monitored page is normal by comparing the advertisement request information of the to-be-monitored page to the advertisement space display information. In addition, in the event that the advertisement request of the to-be-monitored page is determined to be inconsistent with the advertising space display information, the server determines the to-be-monitored page advertisement display to be abnormal.

Inconsistencies between the advertisement request information and the advertising space display information include:

the advertisement space ID included in the advertisement request information does not appear in the advertising space display information, the advertising space specification (advertising space width, advertising space height, or a combination thereof) included in the advertisement request information differs from a specification (advertising space actual display width, advertising space actual display height, or a combination thereof) of the advertising space that corresponds to the same advertising space ID and that is in the advertising space display information, advertising spaces that correspond to different advertising space IDs overlap within the to-be-monitored page, the position of the advertising space within the advertisement request information is inconsistent with the position of the actual display, etc.

When a website owner counterfeits an advertisement request through an automatic process, yet fails to deploy the advertising code in the page corresponding to the source page URL included in the advertisement request, the advertisement request log will have a record of the corresponding page issuing the advertisement request. However, when loading the corresponding page, the server will not obtain the corresponding advertisement request and advertisement display. For example, assuming that a website owner counterfeits an advertisement request through an automatic process, a source page URL included in the advertisement request is URL A, where the advertisement log request will have a record of the page, whose URL is URL A, issuing the advertisement request. Moreover, because the website owner has not deployed advertisement code in the page, whose URL is URL A, the server does not obtain the corresponding advertisement request and advertisement display when the server loads URL A (after obtaining URL A via an analysis of the advertisement request log). In other words, the URL in a list of to-be-monitored URLs obtained by analyzing the advertisement request log does not appear in either the advertisement request information or advertising space display information. In this case, the server also determines the to-be-monitored page advertisement display to be abnormal. In the event that the server detects an abnormality, the server records the abnormality.

Figure 2:
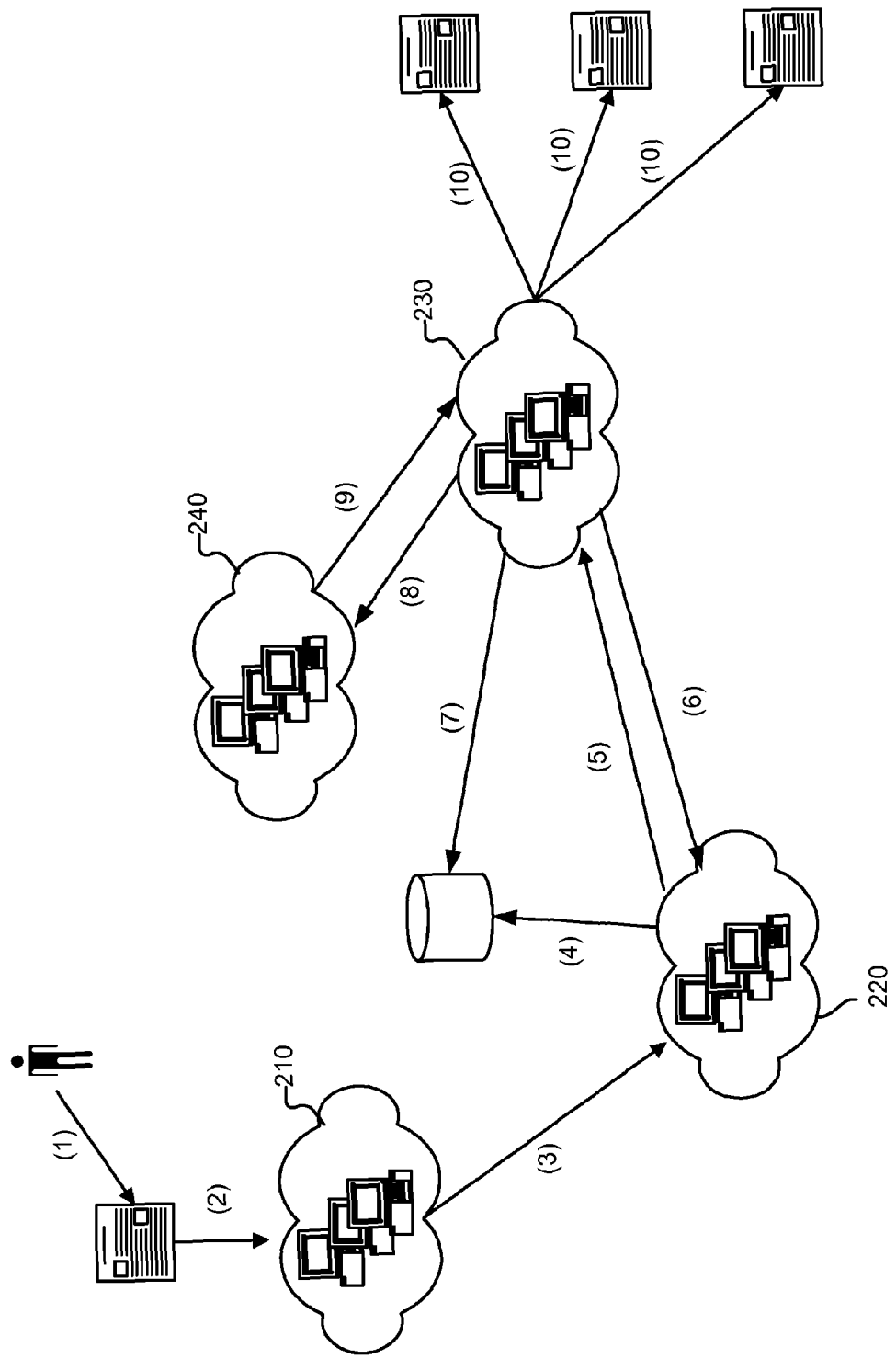
FIG. 2 is a system architecture diagram of an embodiment of a system for monitoring advertising displays.

FIG. 2 is a system architecture diagram of an embodiment of a system for monitoring advertising displays. The system 200 comprises an advertisement front-end server 210, an analysis server 220, a monitoring and capturing server 230, and a view-rendering server 240. The data that is exchanged between two parties is labeled as (1)-(9). The data exchange process is explained in more detail below.

The advertisement front-end server 210 receives an advertisement request (2) via a page request from a user (1), records advertisement request information in a log file, and sends the log file to the analysis server (3). The advertisement request information includes: an advertisement request issuance timestamp, an advertising space ID, advertising space width, advertising space height, an advertising space source page URL, or any combination thereof.

The analysis servers 220 obtains an advertisement request log from the advertisement front-end server 210, determines a URL list of to-be-monitored pages based on the advertisement request log, adds more related results to storage, and stores the final report (4), and receives analysis results from the monitoring and capturing server 230 (6).

The monitoring and capturing server 230 obtains the URL list of the to-be-monitored pages from the analysis server 220 (5), after receiving a preliminary analysis, stores screenshot results (7), and controls a browser to access the URL of the to-be-monitored page, redirects the advertisement request among generated HTTP requests to the view-rendering server 240 (8), receives an advertising space code sent back by the view-rendering server 240 (9), controls the browser to generate an advertising space view zone based on the advertising space code, and then acquires advertising space display information.

The view-rendering server 240, after receiving the advertisement request sent by the monitoring and capturing server 230, generates the advertising space code based on the received advertisement request and sends the generated advertising space code to the monitoring and capturing server 230. The monitoring and capturing server 230 controls the browser to generate an advertising space view zone based on the received advertising space code (10).

Figure 3:
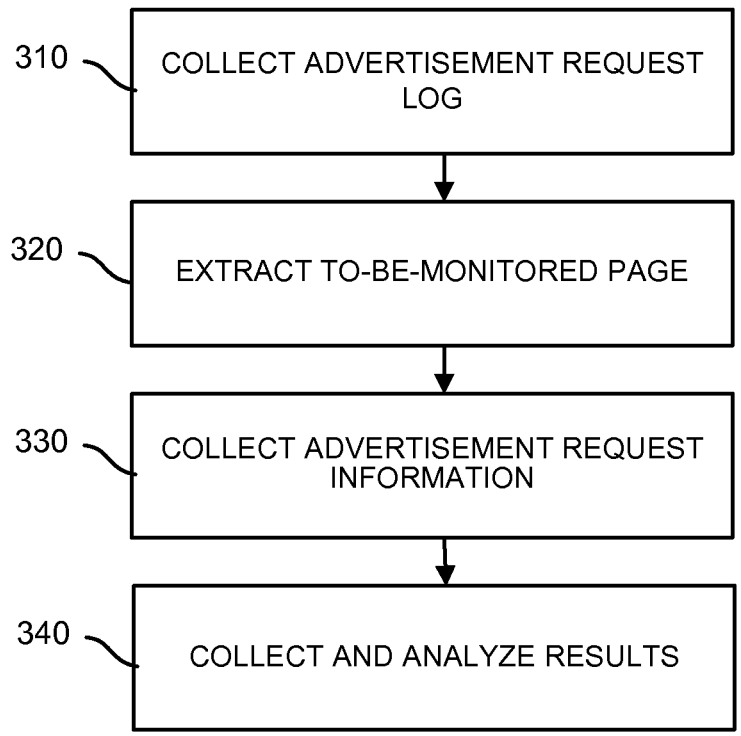
FIG. 3 is a flowchart of an embodiment of a process for collecting information.

FIG. 3 is a flowchart of an embodiment of a process for collecting information. In some embodiments, the process 300 is an implementation of 110, 120, or 160 of FIG. 1 and includes:

In 310, the server collects the advertisement request log.

In some embodiments, when an advertisement front-end server 210 receives the advertisement request, the advertisement front-end server records the advertisement request information into a log file (advertisement request log). The advertisement request information includes: time, advertising space ID, advertising space width, advertising space height, advertising space source page URL, or any combination thereof.

In 320, the server extracts the to-be-monitored page.

In some embodiments, the analysis server acquires the advertisement request log from the advertisement front-end server and counts the occurrences of each advertising space source page URL in the advertisement request log. The analysis server also ranks the advertising space source page URLs in descending order according to occurrence frequency and generates the first N URLs as needed by the system (the URLs of the first N advertisement source pages ranked in descending order by the occurrence frequency to serve as the URLs of to-be-monitored pages). In some embodiments, N is a positive integer.

In 330, the server collects the advertisement request information, advertising space display information, and retained view results of the to-be-monitored page in a list of to-be-monitored pages.

In some embodiments, the monitoring and capturing server obtains a URL of a to-be-monitored page from the analysis server and acquires advertisement request information based on the URL of the to-be-monitored page and advertising space display information for the to-be-monitored page.

Figure 4:
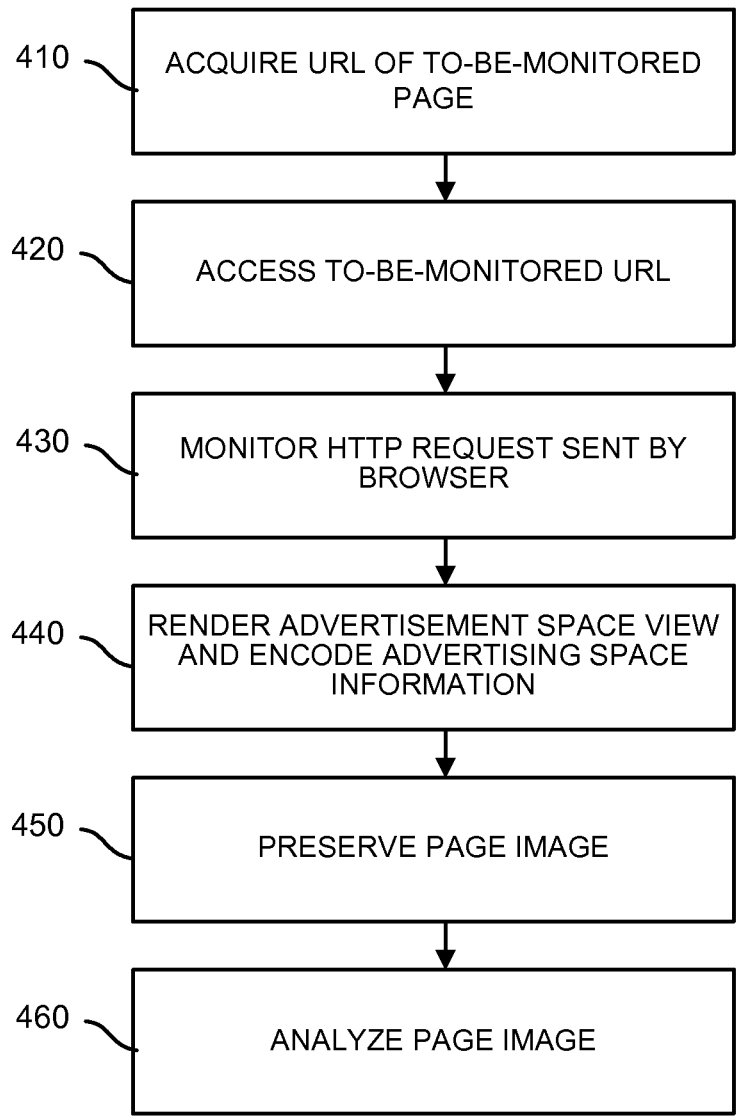
FIG. 4 is a flowchart of an embodiment of a process for collecting advertisement request information.

FIG. 4 is a flowchart of an embodiment of a process for collecting advertisement request information. In some embodiments, the process 400 is an implementation of 330 of FIG. 3 and includes:

In 410, the server acquires a URL of a to-be-monitored page.

In some embodiments, the URL of the to-be-monitored page (i.e., a to-be-monitored URL) is selected from a URL list of to-be-monitored pages. A uniform identifier (expressed as "UID" below, generated using a hash method) corresponding to the URL is generated. In some embodiments, the hash method is MD5. The URL of the to-be-monitored page, the UID corresponding to the URL, and a current timestamp are recorded on a first file. The UID and URL recording on the first file have a one-to-one correspondence.

In 420, the server accesses the to-be-monitored URL via a browser core.

The browser core refers to a core part of a browser application. In some embodiments, developers use the browser core to develop their own functions. In some embodiments, a windows server executes a plurality of processes and each process controls a browser core, and visits web pages like a normal user. The difference between the browser core function and a browser application controlled by the normal user is that the visits of the browser core function are automatic and do not require manual intervention. In some embodiments, the browser core is a mainstream browser core (such as an Internet Explorer (IE) browser core). The browser core includes a rendering engine, and the rendering engine interprets HTML, JavaScript, and other web page languages. The rendering engine also loads pictures, Flash, and other multimedia content. Accessing the URL is interpreted to mean the process of loading and rendering and of generating a web page view for a target URL page.

In 430, the server monitors an HTTP request sent by a browser, identifies the advertisement request in the HTTP request, and redirects the advertisement request to a view-rendering server.

In some embodiments, the browser core concurrently accesses page scripts, pictures, multimedia, iframe, and other resources needed for to-be-monitored page loading. From accessing the URL of the to-be-monitored page to completing page loading, a plurality of HTTP requests are generated. Before each request, a callback of a kernel interface occurs. Therefore, the HTTP requests are intercepted by programming the kernel interface and processed as appropriate.

Figure 5:
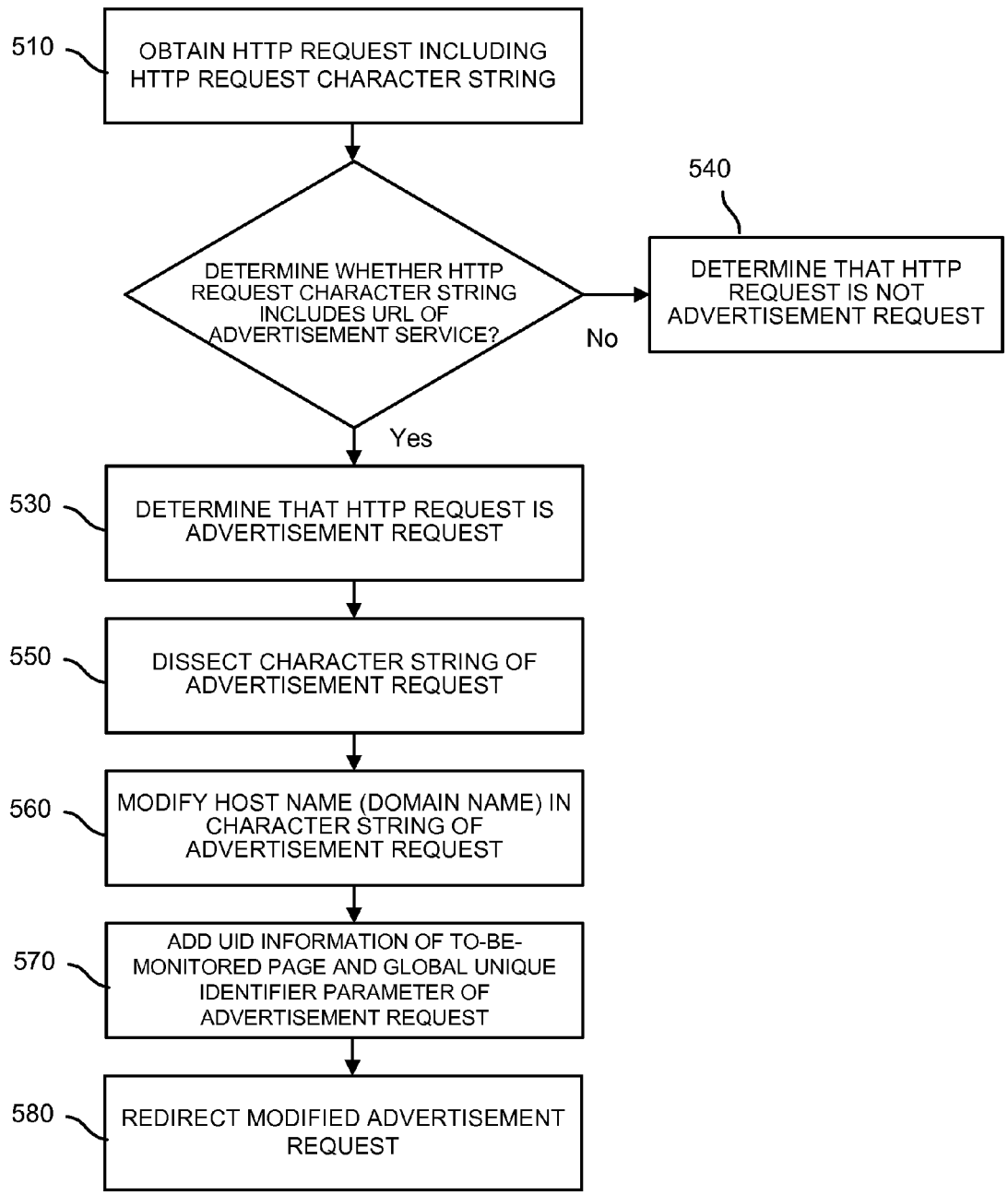
FIG. 5 is a flowchart of an embodiment of a process for HTTP processing.

FIG. 5 is a flowchart of an embodiment of a process for HTTP processing. In some embodiments, the process 500 is an implementation of 430 of FIG. 4 and comprises:

In 510, the server obtains an HTTP request including an HTTP request character string.

In 520, the server determines whether the HTTP request character string includes a URL of an advertisement service.

In 530, in the event that the HTTP request character string includes the URL of the advertisement service (for example, the advertisement service corresponds with http://xyz.com/i.php?), the server determines that the HTTP request is an advertisement request.

In 540, in the event that the HTTP request character string does not include the URL of the advertisement service, the server determines that the HTTP request is not an advertisement request, and the process 500 ends.

In 550, the server dissects character string information of the advertisement request to obtain advertising space ID, advertising space width (W), advertising space height (H), and UID information of the to-be-monitored page, and records the character string information into a second file.

In 560, the server modifies a host name (domain name) in the character string of the advertisement request to the view-rendering server.

In 570, in the character string of the advertisement request, the server adds the UID information of the to-be-monitored page and global unique identifier (View Identifier, expressed as "VID" below) parameters of the advertisement request, and records the VID in the corresponding second file. The global unique identifier of the advertisement request is identifying information that uniquely identifies the advertisement request and is randomly generated after the HTTP request is determined to be an advertisement request.

In 580, the server redirects the modified advertisement request to the view-rendering server.

As an example, an HTTP request that is determined to be an advertisement request contains character string information as follows: http://xyz.com/i.php?adid= 13213213&width= 240&height=180; the URL of the view-rendering server is http://bbb.com/render.php?; the UID of the advertisement service URL in the HTTP request is "aaaad14234abcde"; and the VID of the HTTP request is "xyz1e222eeed". Thus, after the HTTP request undergoes the modification, the addition of the request parameters, and the redirection described above, the above-described character string information is modified to "http://bbb.com/render.php?adid=13213213&width= 240&height=180&uid=aaaad14234abcde&vid=xyz1e222 eeed". The "uid" in the character string is a parameter symbol expressing the UID of the to-be-monitored page. The "vid" in the character string is a parameter symbol expressing the VID of the advertisement request.

The modified and redirected advertisement request exchanges data with the view-rendering server. The data is no longer requested from an advertisement server.

In 440, the server renders the advertisement space view and encodes the advertising space information.

In some embodiments, the view-rendering server corresponds to an HTTP server. After the HTTP request is received, an advertising space code is generated according to the parameters in the HTTP request and sent back to the browser to execute and dissect the segment of standard HTML, CSS, or JavaScript code to generate a rectangular zone view (in other words, the advertising space view) and embed the rectangular zone view in the to-be-monitored page. The parameters included in the advertisement request include: the advertising space unique identification adzone_id (in other words, "adid" in the HTTP request is recorded as ZID), the advertising space width (in other words, width in the HTTP request is recorded as W), advertising space height (in other words, height in the HTTP request is recorded as H), UID (in other words, "uid" in the HTTP request), VID (in other words, "vid" in the HTTP request), or any combination thereof.

The role of the view-rendering server is to replace the zone where the advertisement is to be placed with a color block (canvas) and on the color block render a byte series including the parameter information of the advertisement request and thus facilitate subsequent image identification.

The view rendering includes the following:

The view-rendering server defines an advertising space rectangular zone coordinate system. For example, the coordinates of the left-upper corner of the advertising space are (0, 0), and the coordinates of the right-lower corner of the advertising space are (W−1, H−1). Thus, the advertising space is composed of a total of W*H pixel points. In some embodiments, each pixel point is expressed in terms of an RGB color system, with R, G and B representing red, green, and blue components, respectively, where each component range is 0-255. In other words, each component is described with one byte (in other words, each component includes one byte of information). Therefore, in some embodiments, a pixel point includes three bytes of information. The total amount of information included by the advertising space zone is 3×W×H bytes.

Figure 6:
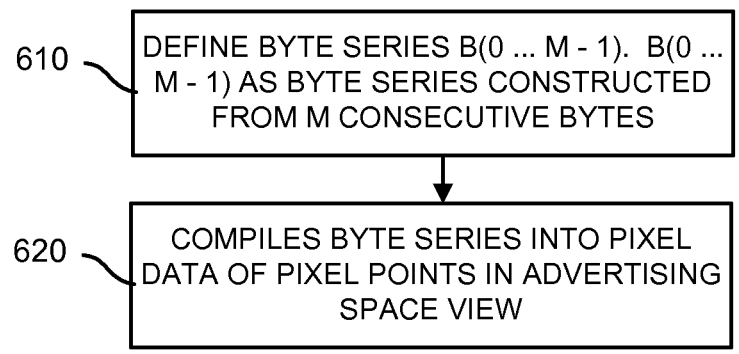
FIG. 6 is a diagram of an embodiment of a process for encoding advertising space information.

FIG. 6 is a diagram of an embodiment of a process for encoding advertising space information. In some embodiments, the process 600 is an implementation of 440 of FIG. 4 and includes:

In 610, the server defines byte series B(0 . . . M−1). B(0 . . . M−1) as a byte series constructed from M consecutive bytes. In some embodiments, the byte series includes a leading magic number, an effective information length identifying part, an effective information content conveying part, an effective information check value, a concluding magic number, or any combination thereof.

The leading magic number identifies the start of the byte series. In some embodiments, bytes B(0), B(1), B(2), B(3), B(4), and B(5) in the byte series are used as the leading magic number. Each of B(0) through B(5) is a byte, with value of the byte being in the 0 to 255 range. For example, the values selected for B(0) through B(5) may be 131 through 136, respectively. When the first six bytes of the byte series are 131 through 136, respectively, these six bytes is the byte series.

The effective information length identifying part identifies the length of the effective information content conveyed by the byte series. In some embodiments, the effective information length identifying part is the byte length of the advertisement request parameter information written into the byte series. In some embodiments, the effective information length identifying part is expressed using B(6) and B(7) in the byte series. Thus, the range of the effective information length is 0 through 65,535.

The effective information content conveying part conveys effective information content. The effective information content corresponds to the parameters of the advertisement request. If the parameters in the advertisement request include a character string, then the character string serves as the effective information content after the character string is converted to a corresponding ASCII code.

The effective information check value is used to check the effective information. In some embodiments, B(m+1) are B(m+2) are used in the byte series as the effective information check value. The effective information check value is set at (B(8)+B(9)+ . . . +B(m))&0xffff, where B(m+1) and B(m+2) constitute the effective information check value.

The concluding magic number identifies the end of the defined byte series. In some embodiments, bytes B(m+3) . . . B(M−1) in the byte series are used as the concluding magic number. Each of B(m+3) through B(M−1) is one byte, with the value range of 0 through 255, for example, the values B(m+3) through B(M−1) are set as the values 231 through 233 or as values arranged according to a preset pattern. In other words, when the last M−m−3 bytes of a byte series are 231 through 233 or the values are arranged according to a preset pattern, subsequent bytes of the byte series do not belong to the byte series.

The effective information content conveying part of the byte series is defined as the parameter information in the advertisement request written into the byte series.

The leading magic number, the concluding magic number, and the number of bytes of the effective information length are not limited by values in the example described above. Obvious changes made by persons skilled in the art fall within the scope of the present application.

In 620, the server compiles the byte series into pixel data of pixel points in the advertising space view.

By selecting a pair of pixel coordinates (X, Y) within the rectangular zone of the advertising space (unit: pixel, same below), the byte series B(0 . . . M−1) is written successively into the RGB components of the consecutive pixel points (X, Y) to (X+ceil(M/3)−1, Y). Each pixel point stores 3 bytes through its RGB components. If M is not a multiple of 3, then the server uses 0 to fill excess RGB components. Ceil(x) is the smallest positive integer no smaller than x.

In some embodiments, the advertising space rendering process flow is as follows:

To ensure that the parameter information written into the RGB components of the pixel points of the advertising space color block is read completely in subsequent process flows (in other words, after embedding into a web page display interface), generally, while writing the parameter information into the RGB components of the pixel points of the advertising space color block, the server cause the start pixel point and end pixel point of the consecutive pixel point series (after writing in the parameter information) to be a certain distance from the edge of the advertising space rectangular zone. In addition, to ensure that the written pixel points are read normally and that overlapping between displayed advertisements are effectively identified, the pixel point series corresponding to each advertisement request is to be written multiple times to different positions in the advertising space rectangular zone. In some embodiments, complete parameter information (for example, including ZID, W, H, UID and VID) is written into only one position of the different positions into which a plurality of pixel point series (corresponding to the same advertisement request) are written within the advertising space rectangular zone. Only the VID is to be written into the other positions.

For example, assuming that len is greater than or equal to the minimum integer of the expression (VID length+2+13)/3, let len=ceil ((VID length+2+13)/3).

Figure 7:
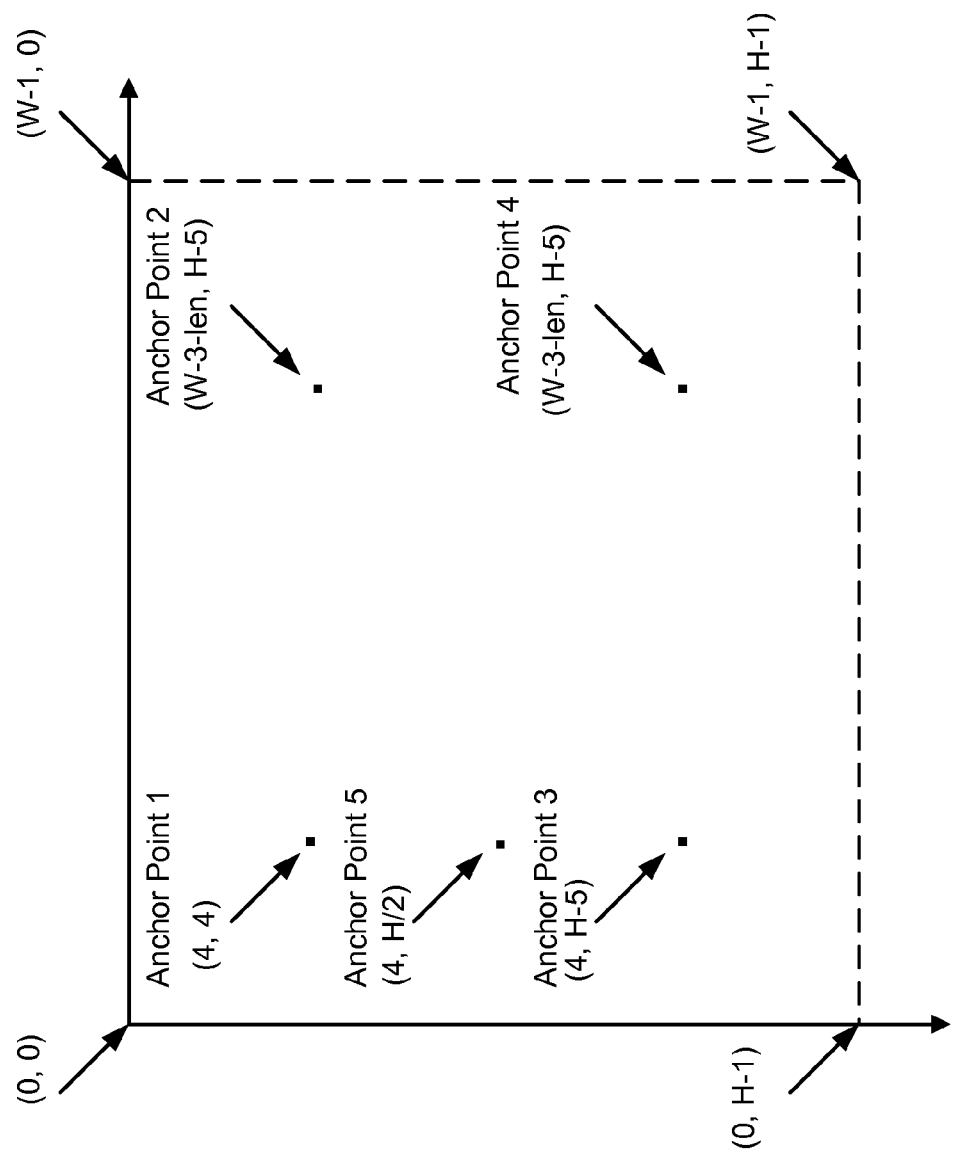
FIG. 7 is a diagram of an example of anchor point positions in an advertising space view.

FIG. 7 is a diagram of an example of anchor point positions in an advertising space view.

The left-upper pixel point (4, 4) of the advertising space rectangular zone is defined as anchor point 1, the right-upper pixel point (W−3−len, 4) is defined as anchor point 2, the left-lower pixel point (4, H−5) is defined as anchor point 3, the right-lower pixel point (W−3−len, H−5) is defined as anchor point 4, and the left-center pixel point (4, H/2) is defined as anchor point 5.

Using the anchor points 1 through 4 as start points, the byte series is written in with the encoding method described above. The byte series payload is: VID, anchor point numbers.

Using anchor point 5 as a start point, the byte series is written in. The byte series payload is: ZID, W, H, UID, VID, anchor point number.

In some embodiments, the rendering of the advertising space view and the encoding of the advertising space information is completed on the view-rendering server. The view-rendering server provides completely rendered advertising space views to to-be-monitored pages for loading. In some embodiments, an advertising space view is also a segment of an advertising space code generated by the view-rendering server and is used to execute the encoding rule, and the segment of advertising space code is provided to the to-be-monitored page for loading. When the to-be-monitored page loads, the segment of advertising space code is run, and the parameter information in the advertisement request is rendered into the advertising space view in accordance with the encoding rule.

In 450, after page loading is completed, the server preserves the page image.

In some embodiments, when the browser completes the entire access process, the page view is saved as a 24-bit bitmap or png file. In some embodiments, no compression loss occurs during the storing of the page view.

In 460, the server analyzes the page image, and decodes the advertising space information.

In some embodiments, assuming that the page image size is X·Y (unit: pixel, same below), and the page image zone has a defined coordinate system, the system starts from the left-upper corner of the page image (for example, page image zone coordinates (0, 0)) and successively read pixel point RGB information until the page image right-lower corner is reached (in other words, page image zone coordinates (X−1, Y−1)). If the server uncovers a byte series as defined in the above encoding method, the server extracts the relevant payload and records the payload and the series start coordinates (m, n) into a third file.

Because anchor point 1 is located in the left-upper corner of the advertising space, anchor point 1 is the first anchor point that is read when the information of all five anchor points is read normally. Based on the coordinates (the series start coordinates of the first byte series) of anchor point 1 in the page image zone coordinate system, the coordinates of anchor point 1 in the advertising space rectangular zone coordinate system, and the specification of the advertising space, determining the position of the advertising space on the page is possible. For example, the coordinates of anchor point 1 in the page image zone coordinate system are (50, 200), the coordinates of anchor point 1 in the advertising space rectangular zone coordinate system are (4,4), and the advertising space specification is (200×400, in other words, advertising space width is 200 and height is 400). Thus, the coordinates of the left-upper corner of the advertising space rectangular zone in the page image zone coordinate system are (46, 196). In other words, the distance between the upper edge of the advertising space rectangular zone and the upper edge of the page image zone is 496, and the distance between the lower edge of the advertising space rectangular zone and the upper edge of the page image zone is 596. The distance between the left edge of the advertising space rectangular zone and the left edge of the page image zone is 46, and the distance between the right edge of the advertising space rectangular zone and the right edge of the page image zone is 246. If the distance between the lower edge of the page home screen and the upper edge of the page image zone is assumed to be 1,000, the advertising space is displayed on the page home screen.

Referring back to FIG. 3, in 340, the server collects and analyzes results, and reports problem pages.

Figure 8:
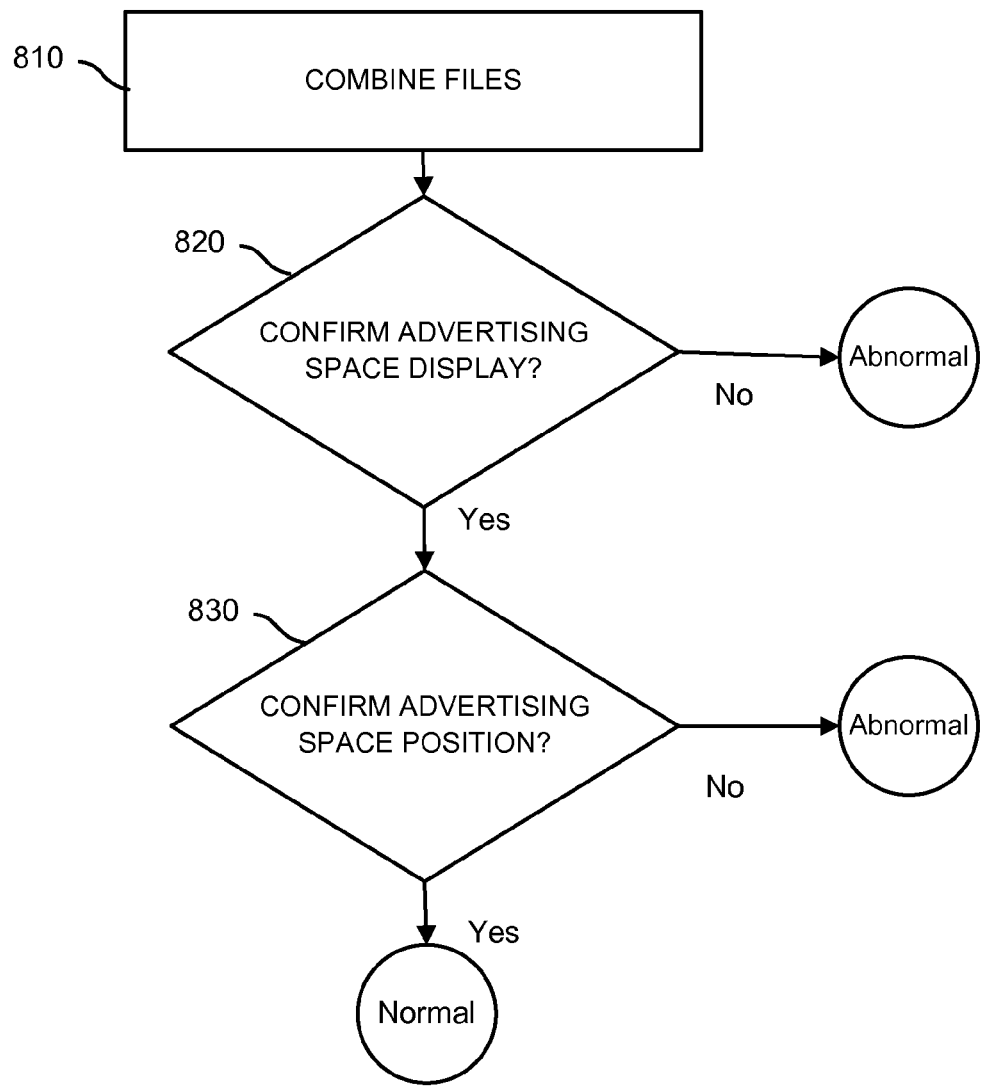
FIG. 8 is a flowchart of an embodiment of a process for collecting and analyzing results.

FIG. 8 is a flowchart of an embodiment of a process for collecting and analyzing results. In some embodiments, the process 800 is an implementation of 340 of FIG. 3 and comprises:

In 810, the server combines files. The files include the first file, the second file, and the third file.

In 820, the server confirms advertising space display. In the event that all of the information on the 5 anchor points relating to the same VID in the third file is collected, the advertisement request display identified as the VID is successful.

In 830, in the event that the advertising space display is successful, the server confirms advertising space position. In some embodiments, the server takes the anchor point no. 1 start coordinates (m, n) and synthesizes the anchor point no. 5 information (ZID, W, H, UID and VID) to reach a conclusion that the advertising space ZID with a size of W×H is successfully displayed on the page whose URL ID is UID. The left-upper corner coordinates of the advertising space, relative to the page left-upper corner, are (m−4, n−4).

In some embodiments, the abnormality of the to-be-monitored page advertisement display comprises:

If VID appears in the second file, a determination whether the advertisement request display identified as the VID is successful based on the third fileis performed.

In the event that the determination of whether the advertisement request display identified as the VID based on the third file is not successful, the server reports a problem with the UID/ZID combination.

The determination of whether the advertisement request display identified as the VID based on the third file is successful comprises: the VID does not appear in the third file (indicating that the advertisement request was not displayed), or the VID appears in the third file, but fewer than 5 anchor points correspond to the VID (indicating overlapping of displayed advertisements) is collected.

In the event that the UID appears in the first file, but not in the second or the third file, the server reports a problem UID, in other words, no advertisement request has been found on the URL corresponding to the UID. In the event that the server reports a problem UID, in some embodiments, the page did not deploy the advertisement code, and the advertisement request was counterfeited by a program directly to the server.

The W, the H, or a combination thereof corresponding to the same VID in the second file differs from the W, the H, or a combination thereof corresponding to this VID in the third file.

In some embodiments, a report is generated based on the first file, the second file, the third file, and the analysis results. The report comprises the following monitoring conclusion: URL, number of advertising spaces (possibly 0), number of advertisement requests (possibly 0), number of advertisement displays (possibly 0), advertising space IDs, and their positions, size information, timestamps, screenshot save positions, or any combination thereof—this information can be supplied to relevant systems for their use.

Figure 9:
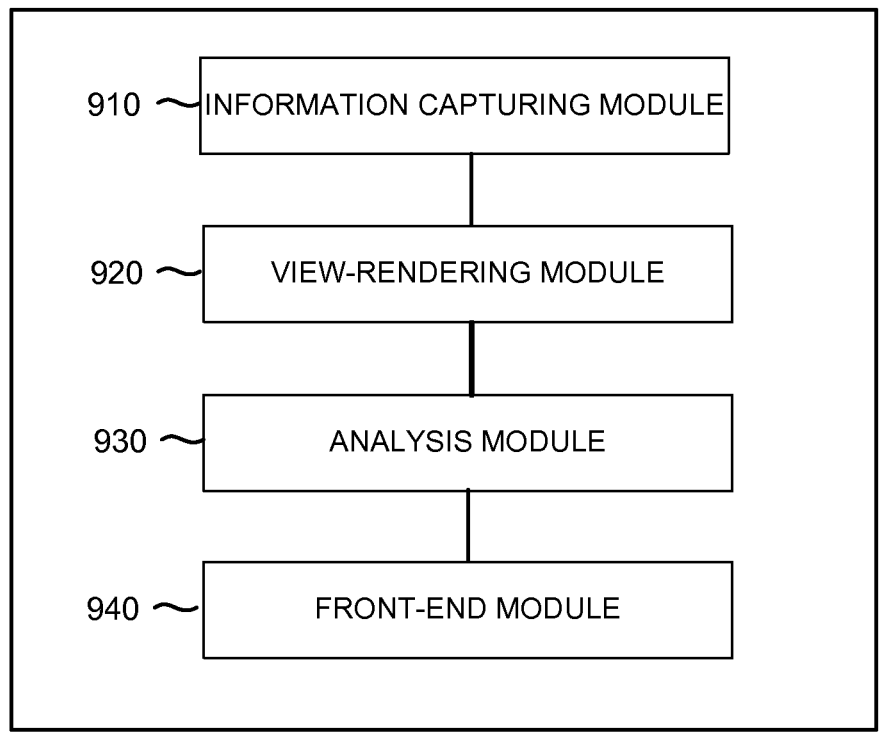
FIG. 9 is an architectural diagram of an embodiment of a system for monitoring advertising displays.

FIG. 9 is an architectural diagram of an embodiment of a system for monitoring advertising displays. The system 900 comprises an information capturing module 910, a view-rendering module 920, an analysis module 930, and a front-end module 940.

The information capturing module 910 acquires advertisement request information included in an advertisement request of a to-be-monitored page and a page view of the to-be-monitored page following loading.

The view-rendering module 920 encodes an advertising space view based on the advertisement request information. The advertising space view is for loading in the to-be-monitored page.

In some embodiments, the view-rendering module 920 includes a view-rendering server and a browser. The view-rendering server generates the advertising space code based on the advertisement request information. The browser executes the advertising space code during the to-be-monitored page loading and renders the advertising space view. The view-rendering server encodes the advertisement request information as pixel data of pixel points in the advertising space view.

The view-rendering server renders the advertising space view based on the advertisement request information and sends back the advertising space view to the to-be-monitored page for loading.

The analysis module 930 dissects a page view, after the to-be-monitored page is loaded, in order to acquire advertising space display information and analyzes the advertising space display information to determine whether the to-be-monitored page advertisement display is normal.

The front-end module 940 determines a URL of the to-be-monitored page.

In some embodiments, the front-end module 940 counts the occurrences of URLs of various advertising space source pages in an advertisement log request, and confirms advertising space source page URLs whose occurrence frequency exceeds a preset threshold value as to-be-monitored page URLs.

In some embodiments, the front-end module 940 counts the occurrences of URLs of the various advertising space source pages in advertisement log request, and ranks advertising space source page URLs from high to low according to occurrence frequency, and confirms the first N advertising space source page URLs as to-be-monitored page URLs. N is a positive integer.

The information capturing module 910 controls a browser core to access the URL of the to-be-monitored page and monitors a hypertext transfer protocol (HTTP) request that is generated, identifies an advertisement request among the hypertext transfer protocol (HTTP) request and acquires advertisement request information included in the advertisement request.

The view-rendering module 920 defines byte sequences constructed from a plurality of consecutive bytes, writes the advertisement request information into the byte sequences; and writes the byte sequences into the pixel values of the pixel points of the advertising space view. The pixel values comprise RGB components of the pixel points.

The analysis module 930 successively reads pixel point RGB information from the left-upper corner of the page view, and upon reaching the byte sequence defined by the view-rendering module 920, acquires advertising space display information according to the read byte sequence.

The analysis module 930 compares the advertising space display information to the advertisement request information to determine whether the advertising space display information and the advertisement request information are the same.

The advertisement request information includes advertising space ID, advertising space width, advertising space height, advertising space source page URL, or any combination thereof. The advertising space display information includes advertising space ID, advertising space actual display width, advertising space actual display height, advertising space display coordinates on the page image, advertising space source page URL, or any combination thereof.

The analysis module 930 determines that the to-be-monitored page advertisement display is abnormal when: the advertising space ID in the advertisement request information fails to appear in the advertising space display information, advertising space width and advertising space actual display width corresponding to the same advertising space ID differ from each other in the advertisement request information and in the advertising space display information, advertising space height and advertising space actual display height corresponding to the same advertising space ID differ from each other in the advertisement request information and in the advertising space display information, or any combination thereof.

The view-rendering module 920 selects a plurality of diversely located anchor points in the advertising space view zone, and separately uses the anchor points as start points and writes the advertisement request information into the RGB components of consecutive pixel points in the advertising space view based on the defined byte sequence.

The analysis model 930, when the plurality of anchor points corresponding to the same advertisement request in the advertising space display information do not entirely appear, determines the advertising space corresponding to the advertisement request to have been covered in the to-be-monitored page or when the server determines that the position of the advertising space in the to-be-monitored page differs from the requested position based on the positions of the anchor points in the page view and the positions of the anchor points in the advertising space view, the server determines that the advertising space display is abnormal.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for monitoring advertisement displays, comprising:
   acquiring advertisement request information in an advertisement request of a page to be monitored;
   encoding and generating an advertising space view for loading in the to-be-monitored page based on the advertisement request information, comprising:
      generating an advertising space code based on the advertisement request information; and
      rendering the advertising space view based on the advertising space code, comprising encoding the advertisement request information as pixel data of pixel points of the advertising space view;
   acquiring a page view of the to-be-monitored page;
   dissecting the page view to acquire advertising space display information, comprising:
      obtaining the advertising space display information from the pixel data for the pixel points of the advertising space view; and
   determining whether an advertisement display of the to-be-monitored page is consistent with the advertisement request information, comprising:
      comparing the advertising space display information to the advertisement request information to determine whether the advertising space display information and the advertisement request information are consistent, wherein:
         the advertisement request information includes advertising space ID, advertising space width, advertising space height, or any combination thereof;
         the advertising space display information includes advertising space ID, advertising space actual display width, advertising space actual display height, advertising space source page URL, or any combination thereof; and
         the advertisement display of the to-be-monitored page is determined to be inconsistent with the advertisement request information includes one or more of the following:
            the advertising space ID in the advertisement request information is different from the advertising space ID in the advertising space display information;
            the advertising space width in the advertisement request information is different from the advertising space actual display width in the advertising space display information; or the advertising space height in the advertisement request information is different from the advertising space actual display height in the advertising space display information.

2. The method as described in claim 1, wherein the advertising space code includes HTML code, JavaScript code, or CSS code.

3. The method as described in claim 1, wherein the encoding of the advertisement request information as pixel data of pixel points of the advertising space view comprises:
writing the advertisement request information into RGB components of the pixel points.

4. The method as described in claim 1, further comprising:
redirecting the advertisement request towards a view-rendering server, the view-rendering server being an HTTP server;
receiving the advertisement request; and
generating the advertising space code corresponding to the advertisement request.

5. The method as described in claim 1, further comprising:
determining uniform resource locator (URL) of the to-be-monitored page, comprising one of the following:
counting occurrences of URLs of advertising space source page in the advertisement request, and confirming advertising space source page URLs whose occurrence frequency exceeds a preset threshold value as to-be-monitored page URLs; and
counting the occurrences of URLs of various advertising space source pages in the advertisement log request, and ranking the advertising space source page URLs from high to low based on occurrence frequency of the advertising space source page URLs, and confirming a first N advertising space source page URLs as the to-be-monitored page URLs, wherein N is a positive integer.

6. The method as described in claim 1, wherein the acquiring of the advertisement request information in the advertisement request of the page to be monitored comprises:
controlling a browser core to access to-be-monitored page URLs and monitoring a hypertext transfer protocol (HTTP) request that is generated; and
identifying the advertisement request among the hypertext transfer protocol (HTTP) request and acquiring the advertisement request information included in the advertisement request.

7. The method as described in claim 1, further comprising:
defining a byte sequence constructed from a plurality of consecutive bytes;
writing the advertisement request information into the byte sequence; and
writing the byte sequence into pixel values of pixel points of the advertising space view.

8. The method as described in claim 7, wherein the byte sequences includes a leading magic number for identifying the start of the byte sequence, an effective information length identifying part for identifying a length of effective information content conveyed by the byte sequence, an effective information content conveying part for conveying parameter information of the advertisement request, an effective information check value for checking effective information, a concluding magic number for identifying the end of the byte sequence, or any combination thereof.

9. The method as described in claim 7, wherein the pixel values comprise RGB components of the pixel points.

10. A method as described in claim 9, wherein the dissecting of the page view to acquire the advertising space display information comprises:
successively reading pixel point RGB information from an left-upper corner of the page view; and
upon reaching the end of the byte sequence, acquiring advertising space display information according to the byte sequence.

11. The method as described in claim 7, wherein rendering the advertising space view based on the advertising space code includes:
selecting a plurality of diversely located anchor points in an advertising space view zone; and
for each anchor point as a start point, writing the advertisement request information into RGB components of consecutive pixel points in the advertising space view based on the byte sequence.

12. The method as described in claim 11, wherein the analyzing of the advertising space display information to determine whether an advertisement display of the to-be-monitored page is consistent with the advertisement request information comprises one or more of the following:
in the event that the plurality of anchor points corresponding to the same advertisement request in the advertising space display information do not entirely appear, determining the advertising space corresponding to the advertisement request to be covered in the to-be-monitored page; and
in the event that a position of the advertising space in the to-be-monitored page differs from a requested position based on positions of the anchor points in the page view and the positions of the anchor points in the advertising space view, determining that the advertising space display is not consistent with the advertisement request information.

13. A system for monitoring advertisement displays, comprising:
at least one processor configured to:
acquire advertisement request information in an advertisement request of a page to be monitored;
encode and generate an advertising space view for loading in the to-be-monitored page based on the advertisement request information, comprising:
generate an advertising space code based on the advertisement request information; and
render the advertising space view based on the advertising space code, comprising encoding the advertisement request information as pixel data of pixel points of the advertising space view;
acquire a page view of the to-be-monitored page;
dissect the page view to acquire advertising space display information, comprising:
obtain the advertising space display information from the pixel data for the pixel points of the advertising space view; and
determine whether an advertisement display of the to-be-monitored page is consistent with the advertisement request information, comprising:
compare the advertising space display information to the advertisement request information to determine whether the advertising space display information and the advertisement request information are consistent, wherein:
the advertisement request information includes advertising space ID, advertising space width, advertising space height, advertising space source page URL, or any combination thereof;
the advertising space display information includes advertising space ID, advertising space actual display width, advertising space actual display height, or any combination thereof; and the advertisement display of the to-be-monitored page is determined to be inconsistent with the advertisement request information includes one or more of the following:

the advertising space ID in the advertisement request information is different from the advertising space ID in the advertising space display information;

the advertising space width in the advertisement request information is different from the advertising space actual display width in the advertising space display information; or the advertising space height in the advertisement request information is different from the advertising space actual display height in the advertising space display information; and a memory coupled to the at least one processor and configured to provide the at least one processor with instructions.

14. A computer program product for monitoring advertisement displays, the computer program product being embodied in a non-transitory computer readable storage medium and comprising computer instructions for:

acquiring advertisement request information in an advertisement request of a page to be monitored;

encoding and generating an advertising space view for loading in the to-be-monitored page based on the advertisement request information, comprising:

generating an advertising space code based on the advertisement request information; and rendering the advertising space view based on the advertising space code, comprising encoding the advertisement request information as pixel data of pixel points of the advertising space view;

acquiring a page view of the to-be-monitored page;

dissecting the page view to acquire advertising space display information, comprising:

obtaining the advertising space display information from the pixel data for the pixel points of the advertising space view; and determining whether an advertisement display of the to-be-monitored page is consistent with the advertisement request information, comprising:

comparing the advertising space display information to the advertisement request information to determine whether the advertising space display information and the advertisement request information are consistent, wherein:

the advertisement request information includes advertising space ID, advertising space width, advertising space height, or any combination thereof;

the advertising space display information includes advertising space ID, advertising space actual display width, advertising space actual display height, advertising space source page URL, or any combination thereof; and the advertisement display of the to-be-monitored page is determined to be inconsistent with the advertisement request information includes one or more of the following:

the advertising space ID in the advertisement request information is different from the advertising space ID in the advertising space display information;

the advertising space width in the advertisement request information is different from the advertising space actual display width in the advertising space display information; or the advertising space height in the advertisement request information is different from the advertising space actual display height in the advertising space display information.

15. The method as described in claim 1, further comprising:

determining whether an hypertext transfer protocol (HTTP) request includes a uniform resource locator (URL) of an advertisement service; and in the event that the HTTP request does not includes the URL of the advertisement service, determining that the HTTP request is not the advertisement request towards a view-rendering server.

16. The method as described in claim 1, further comprising:

redirecting the advertisement request towards a view-rendering server, the view-rendering server being an hypertext transfer protocol (HTTP) server, wherein the redirecting of the advertisement request comprises:

substituting a host name in the advertisement request with a host name of the view-rendering server, wherein the host name in the advertisement request is different from the host name of the view-rendering server.

* * * * *